United States Patent
Hsu et al.

(10) Patent No.: US 12,554,290 B2
(45) Date of Patent: Feb. 17, 2026

(54) ASSEMBLY OF TORQUE MODULE FOR HINGE DEVICE

(71) Applicant: FOSITEK CORPORATION, New Taipei (TW)

(72) Inventors: An Szu Hsu, New Taipei (TW); An-Wei Chung, New Taipei (TW)

(73) Assignee: Fositek Corporation, New Taipei (TW)

( * ) Notice: Subject to any disclaimer, the term of this patent is extended or adjusted under 35 U.S.C. 154(b) by 0 days.

(21) Appl. No.: 18/816,594

(22) Filed: Aug. 27, 2024

(65) Prior Publication Data

US 2025/0383689 A1    Dec. 18, 2025

(30) Foreign Application Priority Data

Jun. 17, 2024 (TW) .................................. 113122397

(51) Int. Cl.
*G06F 1/16* (2006.01)
*F16C 11/04* (2006.01)

(52) U.S. Cl.
CPC ............ *G06F 1/1681* (2013.01); *F16C 11/04* (2013.01)

(58) Field of Classification Search
CPC ......... F16C 11/04; G06F 1/1681; E05D 11/08
USPC ............................ 16/259, 271, 272, 342, 247
See application file for complete search history.

(56) References Cited

U.S. PATENT DOCUMENTS

| | | | | |
|---|---|---|---|---|
| 4,547,930 A * | 10/1985 | King | .................... | E05D 5/023 16/382 |
| 4,553,286 A * | 11/1985 | Schwarz, II | .............. | E05D 5/04 16/382 |
| 5,255,214 A * | 10/1993 | Ma | .................... | F16M 11/10 361/679.55 |
| 5,406,678 A * | 4/1995 | Kaden | .................... | G06F 1/1681 16/342 |
| 6,684,456 B2 * | 2/2004 | Lee | .................... | E05D 11/1078 16/335 |
| 7,533,448 B2 * | 5/2009 | Chern | .................... | G06F 1/1616 16/342 |

(Continued)

FOREIGN PATENT DOCUMENTS

CN    116677706 A * 9/2023 ............. F16C 11/04
JP    2002250331 A * 9/2002

*Primary Examiner* — Jeffrey O'Brien
(74) *Attorney, Agent, or Firm* — Rosenberg, Klein & Lee

(57) ABSTRACT

An assembly of torque module for hinge device includes a torque module having two swing arm assemblies that are synchronously pivotally turnable relative to each other and extended transversely outward in two opposite directions to form a fitting section each; two swing supports symmetrically provided with two receiving sections for receiving the fitting sections therein through engagement of receiving grooves with fitting rails; and two elastic packing elements disposed in the receiving sections and respectively including a rib section downward pressed against a bottom of the receiving section and two lateral supporting sections upward pressed against a bottom of the fitting section. The elastic packing elements compensate any gap between the receiving grooves and the fitting rails to enable lower accuracy of machining the receiving sections and the fitting sections to reduce manufacturing cost while achieves firm and stable connection of the fitting sections with the receiving sections.

20 Claims, 5 Drawing Sheets

(56) References Cited

U.S. PATENT DOCUMENTS

| | | | | |
|---|---|---|---|---|
| 7,578,031 B2* | 8/2009 | Hung | .................. | E05D 11/1014 |
| | | | | 16/337 |
| 7,707,689 B2* | 5/2010 | Kim | .................... | H04M 1/0216 |
| | | | | 16/342 |
| 8,082,627 B2* | 12/2011 | Chien | ................. | H04M 1/0216 |
| | | | | 16/342 |
| 12,031,570 B2* | 7/2024 | Hsu | ........................ | G06F 1/1681 |
| 12,079,047 B2* | 9/2024 | Hsu | ........................ | F16C 11/04 |
| 12,181,932 B2* | 12/2024 | Hsiang | ................. | G06F 1/1652 |
| 12,353,254 B2* | 7/2025 | Yan | ........................ | G06F 1/1624 |
| 12,405,638 B2* | 9/2025 | Hsu | ........................ | G06F 1/1652 |
| 2007/0192994 A1* | 8/2007 | Chuang | ................ | G06F 1/1616 |
| | | | | 16/342 |
| 2007/0214605 A1* | 9/2007 | Tu | ........................ | G06F 1/1616 |
| | | | | 16/342 |
| 2024/0385658 A1* | 11/2024 | You | ........................ | G06F 1/1652 |
| 2025/0306645 A1* | 10/2025 | Liu | ........................ | G06F 1/1616 |

* cited by examiner

ASSEMBLY OF TORQUE MODULE FOR HINGE DEVICE

FIELD OF THE INVENTION

The present invention relates to an assembly of torque module for hinge device, which allows lower machining accuracy to reduce manufacturing cost and can be easily and stably assembled.

BACKGROUND OF THE INVENTION

FIG. 1 is a fragmentary, assembled sectional side view of a conventional hinge mechanism applied to a flexible display of an electronic device. The hinge mechanism includes a holding support 61, two swing arms 62, elastic elements 63, and cam holders 64. The holding support 61 has two pivotal connection sections 611, which respectively have a pin 612 extending therethrough. The two swing arms 62 respectively include a mating pivotal connection section 621, which is provided with a recess 622 for engaging with the pivotal connection section 611. The pins 612 extend through the mating pivotal connection sections 621 and the pivotal connection sections 611 such that the swing arms 62 are pivotally connected to the holding support 61. The elastic elements 63 drive the two cam holders 64 to press against two axially opposite sides of the swing arms 62. The cam holders 64 and the swing arms 62 are correspondingly provided with a plurality of cams. When the cams on the swing arms 62 and the cam holders 64 are elastically engaged with one another, the two swing arms 62 can be located in place relative to the holding support 61 when the swing arms 62 are folded or expended to include one of some specific angles between them, such as zero, 90, or 180 degrees.

China Utility Model Patent No. CN 220581489U discloses a hinge and electronic device using the same. The hinge includes two virtual-shaft holding supports respectively pivotally connected to a first base, and two real-shaft holding supports respectively pivotally connected to a second base; a synchronizer is provided between two corresponding first and second bases; a synchronizing holding support is provided between two corresponding virtual-shaft and real-shaft holding supports; real shafts are provided on outer sides of the two second bases to extend through the second bases, the synchronizers, and the first bases; a compression spring is provided on each of the real shafts to press against the real-shaft holding support and the synchronizing holding supports via two meshing gears; and the real-shaft holding supports driven by the meshing gears can be brought by the synchronizing holding supports to turn pivotally along with the virtual-shaft holding supports. Further, the virtual-shaft holding supports are respectively provided with a recess for engaging with protruded blocks correspondingly provided on a plate main body. The recesses are respectively internally provided with a penetrating fixing section, and the protruded blocks are respectively provided with a dot corresponding to the fixing section for setting into the fixing section and being held thereto.

In practical use of the above hinge structure having parallel virtual-shaft holding supports and real-shaft holding supports, the virtual-shaft holding supports are connected to the plate through direct engagement of the recesses with the protruded blocks on the plate. To enable firm and stable connection of the recesses and the protruded blocks, the recesses and the protruded blocks must be machined with high accuracy, which inevitably increases the manufacturing cost and the difficulty in assembling to form disadvantages and limits in manufacturing.

On the other hand, to facilitate easy assembling by reducing the machining accuracy would produce gaps between the virtual-shafts and the plate main body and accordingly, result in loose connection between them, which might very possibly lead to unstable or inaccurate overall hinge operation. Therefore, a dilemma of accurate assembling and simplified machining is encountered in terms of how the virtual-shaft holding supports are assembled to the plate main body.

In view of the disadvantages in the conventional hinge mechanism, it is therefore tried by the inventor to develop an improved assembly of torque module for hinge device.

SUMMARY OF THE INVENTION

A primary object of the present invention is to provide an assembly of torque module for hinge device mainly includes a torque module having two swing arm assemblies, which are synchronously pivotally turnable relative to each other and are extended outward in two opposite directions relative to an axial direction of the assembly of torque module to form a fitting section each; two swing supports being provided symmetrically on respective one surface with a receiving section having receiving grooves for receiving fitting rails of the fitting sections therein; and two elastic packing elements being disposed in the two receiving sections to elastically press downward against a bottom of the receiving sections and upward against a bottom of the fitting sections to elastically compensate any gap between the fitting rails and the receiving grooves. With these arrangements, the receiving sections and the fitting sections can be machined with lower accuracy to reduce manufacturing cost and can be assembled more easily to upgrade production efficiency.

Another object of the present invention is to provide the above assembly of torque module for hinge device, of which the swing arm assemblies respectively include a primary and a second swing arm located adjacent to each other and arranged side by side with a gap existing between them. With the gap existing between the primary and the second swing arm, the fitting section can be slightly bent and deformed toward the gap, such that the fitting section received in the receiving section is not in tight-fit relation with two side walls of the receiving section while the elastic packing element can elastically and vertically push against the bottom of the receiving section and the fitting section to effectively overcome the deformation of the primary and the second swing arm relative to each other and enable the swing arm assembly to firmly and stably assembled to the swing support.

To achieve the above and other objects, the assembly of torque module for hinge device of the present invention includes a torque module having two swing arm assemblies, which are synchronously pivotally turnable relative to each other and are extended outward in two opposite directions relative to an axial direction of the assembly of torque module to form a fitting section each; two swing supports being provided symmetrically on respective one surface with a receiving section for receiving the fitting sections therein; and two elastic packing elements being respectively disposed in one receiving section to elastically press downward against a bottom of the receiving sections and upward against a bottom of the fitting sections to elastically compensate any gap between the fitting section and the receiving section.

In the above structure, each of the elastic packing elements has a rib section located at an axially middle portion thereof for elastically pressing downward against the bottom of the receiving section; and portions of the elastic packing element located at two lateral sides of the rib section are two supporting sections for elastically pressing upward against the bottom of the fitting section.

In the above structure, each of the receiving sections is provided on the bottom thereof with at least one locating section; each of the elastic packing elements is provided on the rib section with at least one mating locating section corresponding to the locating section. The elastic packing element is held in place in the receiving section through engagement of the at least one mating locating section with the at least one locating section.

In the above structure, the locating section is a protrusion, and the mating locating section is a hole for fitting on around the locating section.

In the above structure, each of the receiving sections is in the form of a recess having two open ends and is provided on two opposite sides with a receiving groove each; and each of the fitting sections on the swing arm assemblies is slid into the receiving section via one open end thereof with two fitting rails formed on two lateral sides of the fitting section being correspondingly extended into the receiving grooves.

In the above structure, each of the elastic packing elements is slid into the receiving section via one open end thereof along the same direction as that in which the fitting section is slid into the receiving section; and two edges of each of the elastic packing elements facing toward the open ends of the receiving section are respectively formed into a downward bent edge extending toward the rib section.

In the above structure, two curved turning arms respectively having a pivotal connecting section are further included. And, each of the swing supports is provided with at least one mating pivotal connecting section. Each of the two swing supports is pivotally connectable to one of the curved turning arms by extending a pivot shaft through the at least one mating pivotal connecting section of the swing support and the pivotal connecting section of the curved turning arm.

In the above structure, a curved arm support is further provided between the two swing supports. The curved arm support is provided at two lateral sides with a concave section each, and each of the two curved turning arms is provided with a convex section. The convex sections are slidable along curved surfaces of the concave sections.

In the above structure, the curved arm support covers a part of the torque module and is provided at portions corresponding to the two swing arm assemblies with a cut each.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof with reference to the accompanying drawings.

Figure 1:
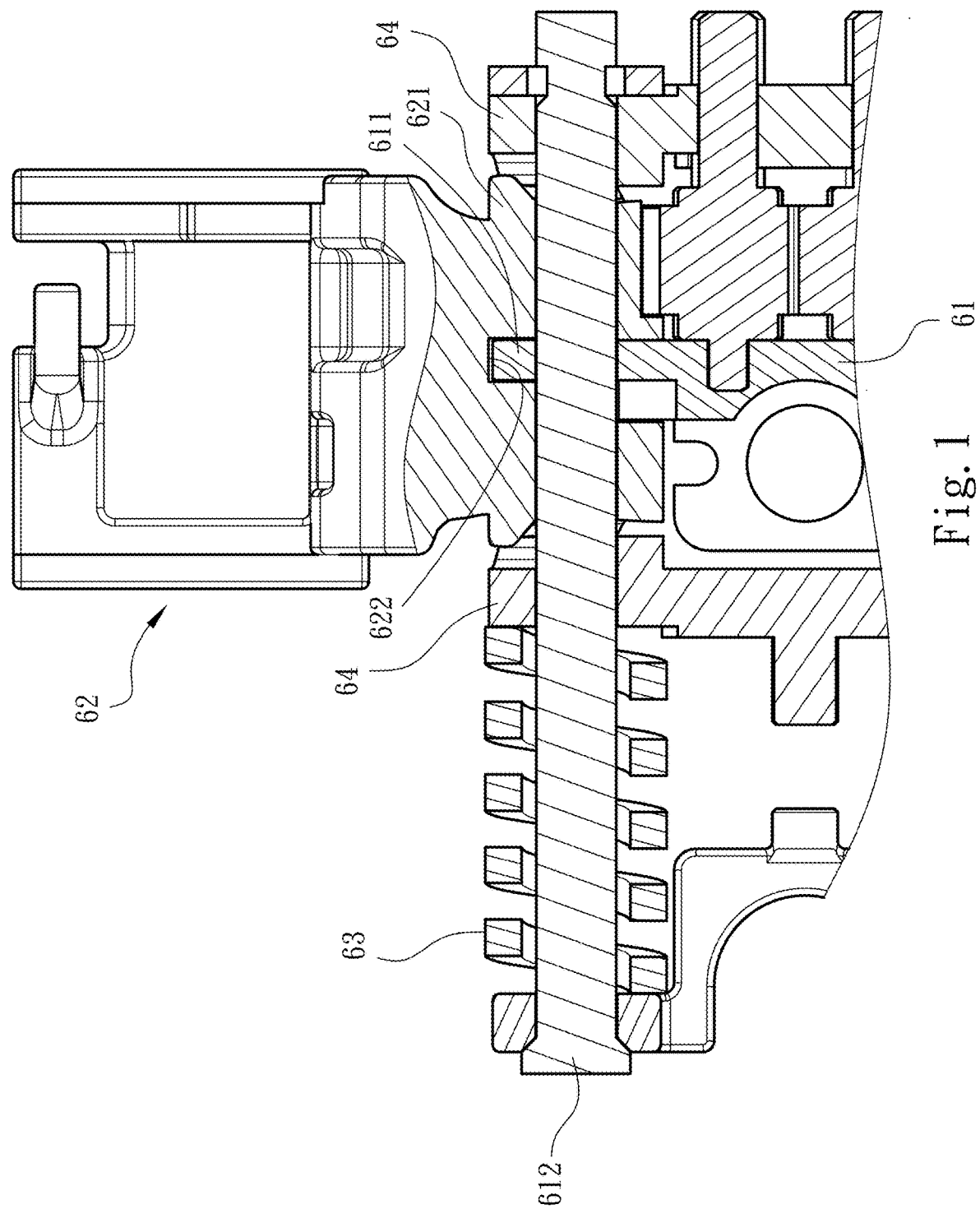
FIG. 1 is as assembled sectional side view of a conventional hinge mechanism for use with a flexible display.
Figure 2:
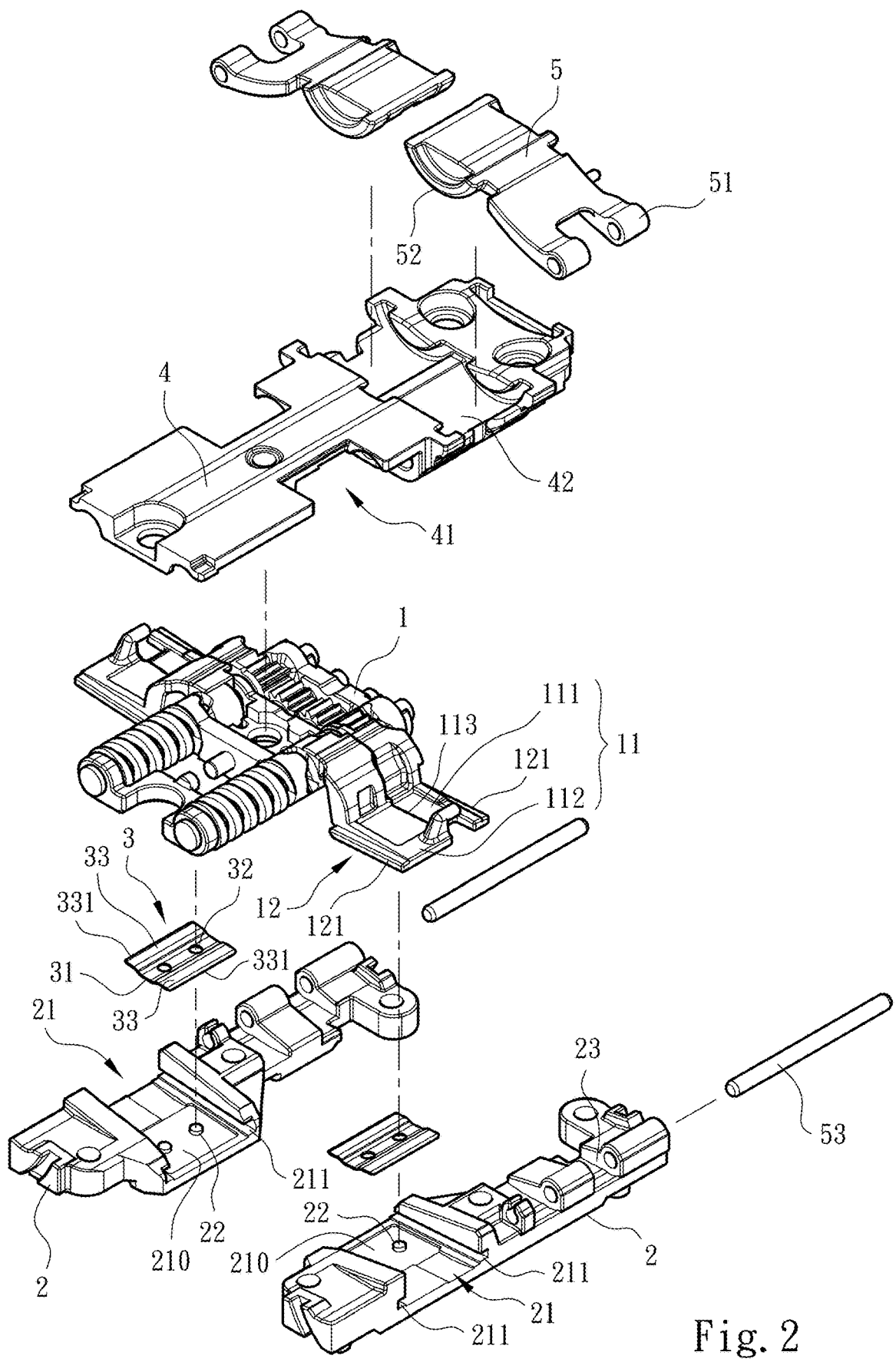
FIG. 2 is an exploded perspective view of an assembly of torque module for hinge device according to a preferred embodiment of the present invention.
Figure 3:
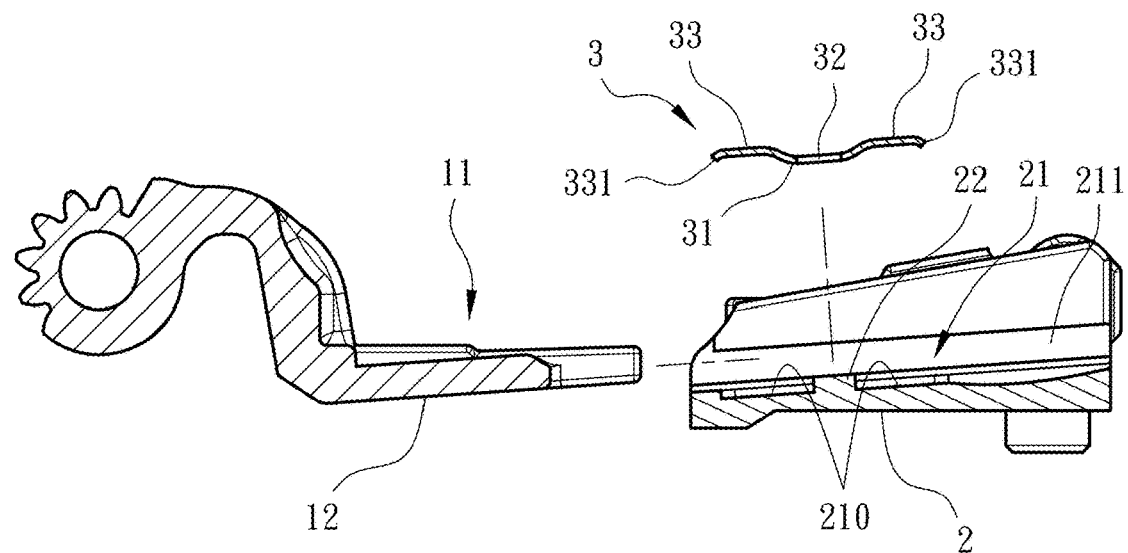
FIG. 3 is an exploded sectional front view showing a swing arm assembly, a swing support, and an elastic packing element included in the assembly of torque module for hinge device shown in FIG. 2.
Figure 4:
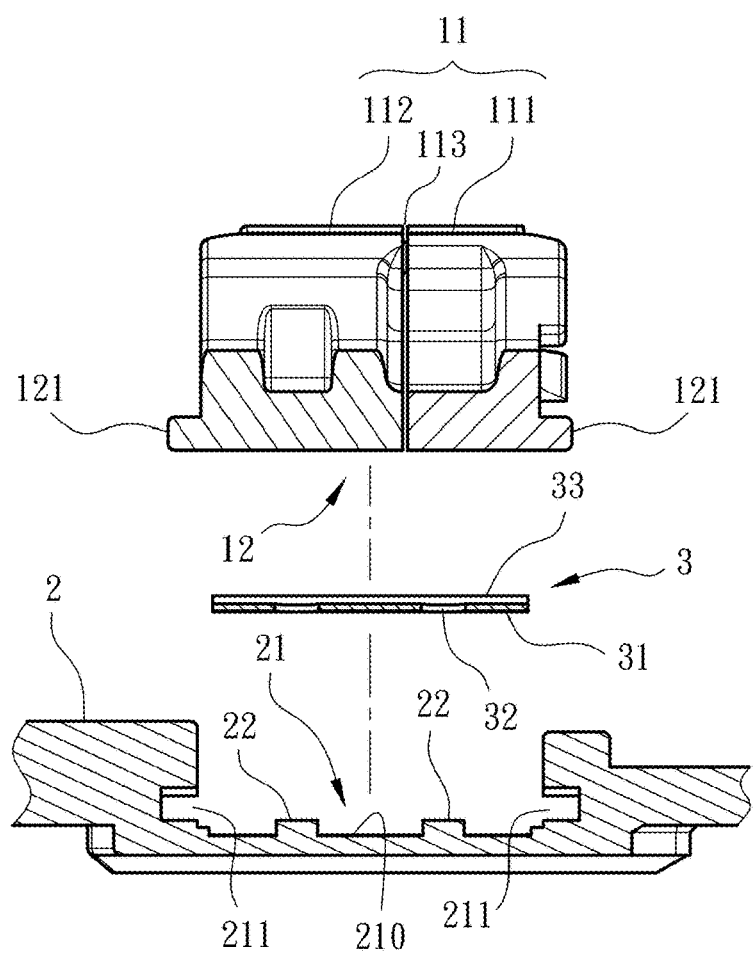
FIG. 4 is a partially sectioned side view of FIG. 3.

Please refer to FIGS. 2 to 4. An assembly of torque module for hinge device according to a preferred embodiment of the present invention mainly includes a torque module 1, a pair of swing supports 2, and a pair of elastic packing elements 3. The torque module 1 includes two swing arm assemblies 11, which are synchronously pivotally turnable relative to each other, and are extended outward in two opposite directions relative to an axial direction of the assembly of torque module to form a fitting section 12 each. Each of the fitting sections 12 has two fitting rails 121 provided on two axially opposite sides thereof.

In an operable embodiment, each of the swing arm assemblies 11 includes a primary swing arm 111 and a secondary swing arm 112, which are located adjacent to each other and arranged side by side with a gap 113 formed between them.

The pair of swing supports 2 is provided symmetrically on respective one surface with a receiving section 21, which is in the form of a recess having a smaller open top and a larger closed bottom. Each of the receiving sections 21 has two opposite open ends corresponding to two lateral sides of the swing support 2, and the fitting sections 12 of the swing arm assemblies 11 are laterally extended into the receiving sections 21 via the open ends. Each of the two receiving sections 21 is provided on two opposite sides that are perpendicular to the swing support 2 with a receiving groove 211 each corresponding to the fitting rails 121 on the fitting sections 12 of the swing arm assemblies 11. And, the receiving sections 21 are provided on respective bottom surface with at least one locating section 22, which can be a dot or a protrusion.

In an operable embodiment, each of the two swing supports 2 may be further provided, according to actual need, to one side of the receiving section 21 with at least one mating pivotal connecting section 23 (see FIG. 2). Each of the two swing supports 2 can be pivotally connected to a curved turning arm 5 by extending a pivot shaft 53 through the mating pivotal connecting section 23 and a pivotal connecting section 51 provided on the curved turning arm 5. The two curved turning arms 5 are provided at respective one end opposite to the pivotal connecting section 51 with a downward convex section 52.

The two elastic packing elements 3 are respectively moved in the same direction as that in which the fitting section 12 of the swing arm assembly 11 are slid into the receiving section 21, such that the elastic packing element 3 is transversely positioned in the receiving section 21. Each of the elastic packing elements 3 includes a downward convex rib section 31 located at an axially middle portion thereof, and other portions of the elastic packing element 3 located at two lateral sides of the rib section 31 are formed into a supporting section 33 each. The rib section 31 is provided with mating locating sections 32, such as holes, for correspondingly fitting on around the locating sections 22; such that the elastic packing element 3 is held in place in the receiving section 21 with the rib section 31 pressed against the bottom of the receiving section 21.

In an operable embodiment, edges of the supporting sections 33 farther away from the rib section 31, i.e. two edges of the elastic packing element 3 facing toward the open ends of the receiving section 21, are respectively formed into a bent edge 331, which is bent downward in the same direction as that in which the rib section 31 is protruded.

In the preferred embodiment, the two swing supports 2 may have a curved arm support 4 provided between them according to actual need. The curved arm support 4 covers a part of the torque module 1, and is provided at portions corresponding to the two swing arm assemblies 11 with a cut 41 each. Further, the curved arm support 4 is provided at two lateral upper sides with a concave section 42 each for fitly engaging with the downward convex sections 52 of the curved turning arms 5.

Figure 5:
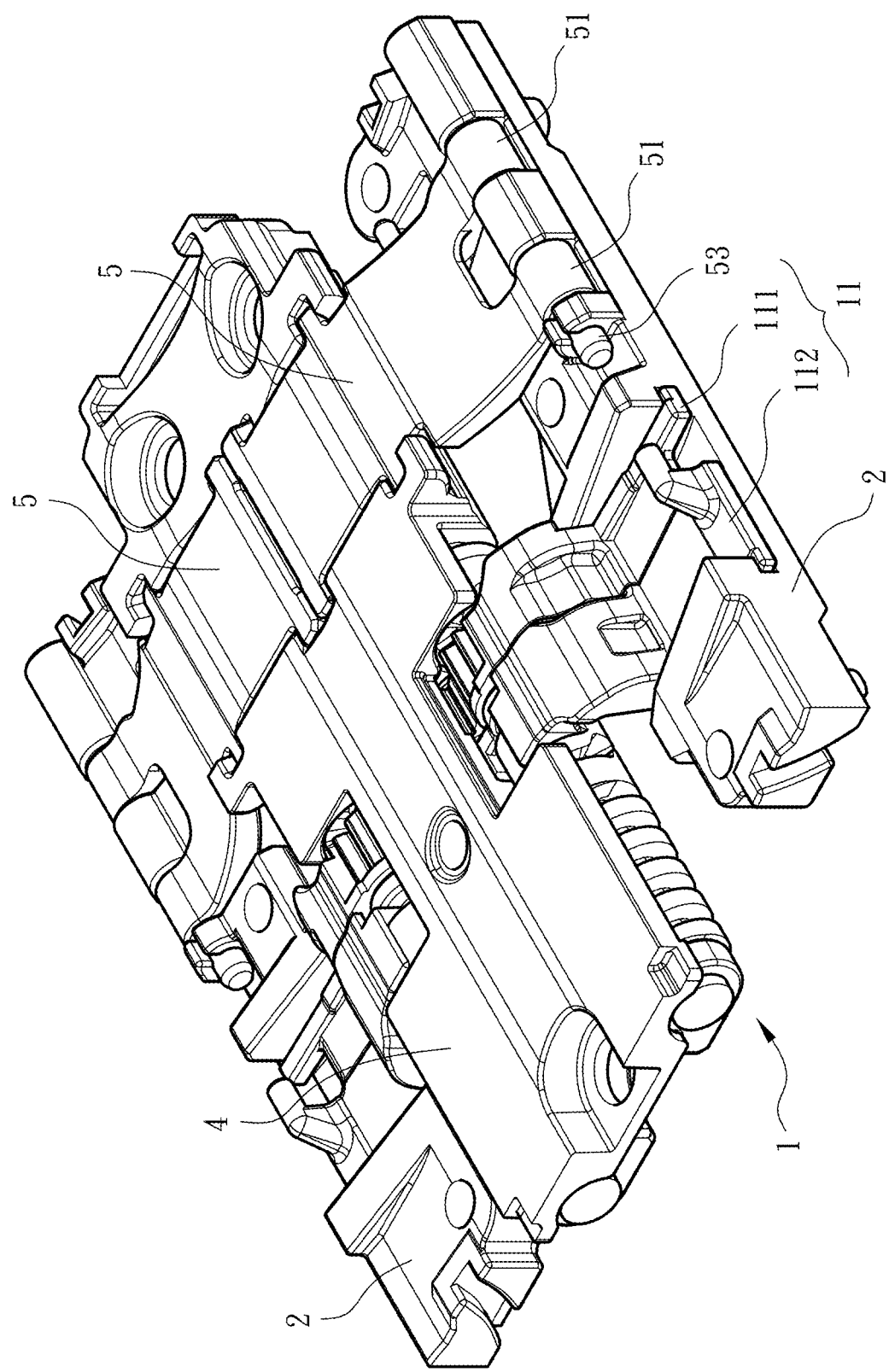
FIG. 5 is an assembled perspective view of FIG. 2.
Figure 6:
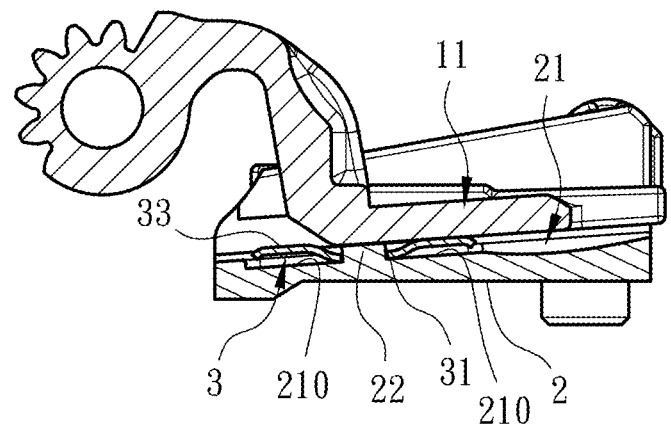
FIG. 6 is an assembled view of FIG. 3.
Figure 7:
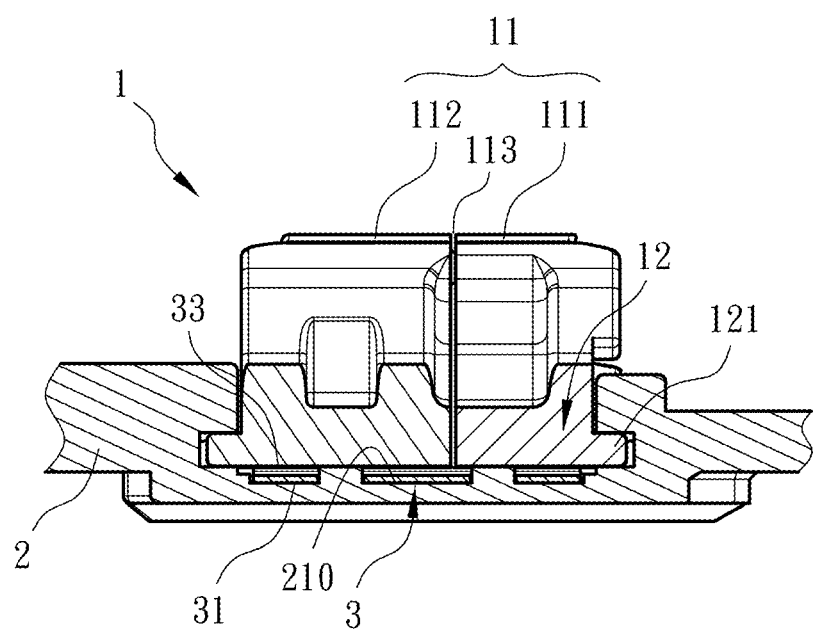
FIG. 7 is an assembled view of FIG. 4.

Please refer to FIGS. 5 to 7. To assemble the assembly of torque module of the present invention, first engage the mating locating sections or holes 32 of the elastic packing elements 3 with the locating sections or dots or protrusions 22 of the swing supports 2, so that the elastic packing elements 3 are located in and held to the receiving sections 21. Then, slide the fitting sections 12 on the swing arm assemblies 11 of the torque module 1 into the receiving sections 21 via the open ends thereof, so that the fitting rails 121 are slidable along the receiving grooves 211. The fitting sections 12 on the swing arm assemblies 11 are guided by the bent edges 331 of the elastic packing elements 3 to pass over the supporting sections 33 smoothly into an assembled position. At this point, the supporting sections 33 push upward against the bottoms of the fitting sections 12, bringing the fitting rails 121 to press their tops against upper surfaces of the receiving grooves 211, such that any gap between the fitting sections 12 on the swing arm assemblies 11 of the torque module 1 and the receiving sections 21 of the swing supports 2 is compensated by an elastic pressing force of the elastic packing elements 3 and the swing arm assemblies 11 are elastically forced against and stably held to the swing supports 2.

In practical application of the present invention, the two swing arm assemblies 11 of the torque module 1 are located in the two cuts 41 of the curved arm support 4 and are pivotally turnable synchronously relative to each other. The two swing supports 2 are moved along with the pivotally turned swing arm assemblies 11 and bring the two curved turning arms 5 to move at the same time, such that the convex sections 52 of the curved turning arms 5 are slidable on the concave sections 42 on the curved arm support 4, enabling the two curved turning arms 5 to pivotally turn relative to the curved arm support 4.

In the present invention, the elastic packing elements 3 are disposed between and elastically pressed against the receiving sections 21 and the fitting sections 12 to enable an elastically tight connection between the swing arm assemblies 11 and the swing supports 2. With the elastic packing elements 3, a somewhat larger accuracy error and accordingly a lower tight fitness between the receiving sections 21 and the fitting sections 12 are allowable in machining of them to facilitate reduction of manufacturing cost. Meanwhile, the bent edges 331 along the supporting sections 33 of the elastic packing elements 3 serve to guide the fitting sections 12 of the swing arm assemblies 11 to pass over the supporting sections 33 smoothly, enabling convenient assembling of the torque module 1.

According to the above discussion, the assembly of torque module for hinge device of the present invention has the advantages of reducing manufacturing cost by lowering required machining precision and enabling easy and stable connection between the torque module and the swing supports. Therefore, the present invention meets the requirements of novelty and improvement for granting a patent. It is also understood the present invention has been described with some preferred embodiments thereof and it is understood that many changes and modifications in the described embodiments can be carried out without departing from the scope and the spirit of the invention that is intended to be limited only by the appended claims.

What is claimed is:

1. An assembly of torque module for hinge device, comprising:
    a torque module (1) including two swing arm assemblies (11), which are synchronously pivotally turnable relative to each other and are extended outward in two opposite directions relative to an axial direction of the assembly of torque module to form a fitting section (12) each;
    a pair of swing supports (2) each being provided on one surface with a receiving section (21) for receiving respective fitting sections (12) therein; and
    a pair of elastic packing elements (3) each being disposed in respective receiving sections (21) to elastically press downward against a bottom (210) of the receiving sections (21) and upward against a bottom of the fitting sections (12) to elastically compensate any gap between the fitting sections (12) and the receiving sections (21).

2. The assembly of torque module for hinge device as claimed in claim 1, wherein each of the elastic packing elements (3) has a rib section (31) located at an axially middle portion thereof for elastically pressing downward against the bottom (210) of the corresponding receiving section (21); and portions of each elastic packing element (3) located at two lateral sides of the rib section (31) being two supporting sections (33) for elastically pressing upward against the bottom of the corresponding fitting section (12).

3. The assembly of torque module for hinge device as claimed in claim 2, wherein each of the receiving sections (21) is provided on the bottom (210) thereof with at least one locating section (22); each of the elastic packing elements (3) being provided on the rib section (31) with at least one mating locating section (32) corresponding to the locating section (22); and each elastic packing element (3) being held in place in the corresponding receiving section (21) through engagement of the at least one mating locating section (32) with the at least one locating section (22).

4. The assembly of torque module for hinge device as claimed in claim 3, wherein the locating section (22) is a protrusion, and the mating locating section (32) being a hole for fitting on and around the locating section (22).

5. The assembly of torque module for hinge device as claimed in claim 1, wherein each of the receiving sections (21) is in the form of a recess having two open ends and is provided on two opposite sides with a receiving groove (211) each; and each of the fitting sections (12) on the swing arm assemblies (11) being slid into the corresponding receiving section (21) via one open end thereof with two fitting rails (121) formed on two lateral sides of the fitting section (12) being correspondingly extended into the receiving grooves (211).

6. The assembly of torque module for hinge device as claimed in claim 2, wherein each of the receiving sections (21) is in the form of a recess having two open ends and is provided on two opposite sides with a receiving groove (211) each; and each of the fitting sections (12) on the swing arm assemblies (11) being slid into the corresponding receiving section (21) via one open end thereof with two fitting rails (121) formed on two lateral sides of the fitting section (12) being correspondingly extended into the receiving grooves (211).

7. The assembly of torque module for hinge device as claimed in claim 3, wherein each of the receiving sections (21) is in the form of a recess having two open ends and is provided on two opposite sides with a receiving groove (211) each; and each of the fitting sections (12) on the swing arm assemblies (11) being slid into the corresponding receiving section (21) via one open end thereof with two fitting rails (121) formed on two lateral sides of the fitting section (12) being correspondingly extended into the receiving grooves (211).

8. The assembly of torque module for hinge device as claimed in claim 5, wherein each of the elastic packing elements (3) is slid into the corresponding receiving section (21) via one open end thereof along a same direction as that in which the corresponding fitting section (12) is slid into the corresponding receiving section (21); and two edges of each of the elastic packing elements (3) facing toward the open ends of the corresponding receiving section (21) being formed into a bent edge (331) each.

9. The assembly of torque module for hinge device as claimed in claim 6, wherein each of the elastic packing elements (3) is slid into the corresponding receiving section (21) via one open end thereof along a same direction as that in which the corresponding fitting section (12) is slid into the corresponding receiving section (21); and two edges of each of the elastic packing elements (3) facing toward the open ends of the corresponding receiving section (21) being formed into a bent edge (331) each.

10. The assembly of torque module for hinge device as claimed in claim 1, further comprising two curved turning arms (5) each having a pivotal connecting section (51); and wherein each of the swing supports (2) is provided with at least one mating pivotal connecting section (23); and each of the two swing supports (2) being pivotally connectable to a corresponding one of the curved turning arms (5) by extending a pivot shaft (53) through the at least one mating pivotal connecting section (23) of the corresponding swing support (2) and the pivotal connecting section (51) of the corresponding curved turning arm (5).

11. The assembly of torque module for hinge device as claimed in claim 2, further comprising two curved turning arms (5) each having a pivotal connecting section (51); and wherein each of the swing supports (2) is provided with at least one mating pivotal connecting section (23); and each of the two swing supports (2) being pivotally connectable to a corresponding one of the curved turning arms (5) by extending a pivot shaft (53) through the at least one mating pivotal connecting section (23) of the corresponding swing support (2) and the pivotal connecting section (51) of the corresponding curved turning arm (5).

12. The assembly of torque module for hinge device as claimed in claim 5, further comprising two curved turning arms (5) each having a pivotal connecting section (51); and wherein each of the swing supports (2) is provided with at least one mating pivotal connecting section (23); and each of the two swing supports (2) being pivotally connectable to a corresponding one of the curved turning arms (5) by extending a pivot shaft (53) through the at least one mating pivotal connecting section (23) of the corresponding swing support (2) and the pivotal connecting section (51) of the corresponding curved turning arm (5).

13. The assembly of torque module for hinge device as claimed in claim 8, further comprising two curved turning arms (5) each having a pivotal connecting section (51); and wherein each of the swing supports (2) is provided with at least one mating pivotal connecting section (23); and each of the two swing supports (2) being pivotally connectable to a corresponding one of the curved turning arms (5) by extending a pivot shaft (53) through the at least one mating pivotal connecting section (23) of the corresponding swing support (2) and the pivotal connecting section (51) of the corresponding curved turning arm (5).

14. The assembly of torque module for hinge device as claimed in claim 9, further comprising two curved turning arms (5) each having a pivotal connecting section (51); and wherein each of the swing supports (2) is provided with at least one mating pivotal connecting section (23); and each of the two swing supports (2) being pivotally connectable to a corresponding one of the curved turning arms (5) by extending a pivot shaft (53) through the at least one mating pivotal connecting section (23) of the corresponding swing support (2) and the pivotal connecting section (51) of the corresponding curved turning arm (5).

15. The assembly of torque module for hinge device as claimed in claim 10, further comprising a curved arm support (4) provided between the two swing supports (2); the curved arm support (4) being provided with a concave section (42), and each curved turning arm (5) being provided with a convex section (52); and the convex section (52) being slidable along curved surfaces of the concave section (42).

16. The assembly of torque module for hinge device as claimed in claim 12, further comprising a curved arm support (4) provided between the two swing supports (2); the curved arm support (4) being provided with a concave section (42), and each curved turning arm (5) being provided with a convex section (52); and the convex section (52) being slidable along curved surfaces of the concave section (42).

17. The assembly of torque module for hinge device as claimed in claim 14, further comprising a curved arm support (4) provided between the two swing supports (2); the curved arm support (4) being provided with a concave section (42), and each curved turning arms (5) being provided with a convex section (52); and the convex section (52) being slidable along curved surfaces of the concave section (42).

18. The assembly of torque module for hinge device as claimed in claim 15, wherein the curved arm support (4) covers a part of the torque module (1) and is provided at portions corresponding to the swing arm assemblies (11) with a pair of cuts (41).

19. The assembly of torque module for hinge device as claimed in claim 16, wherein the curved arm support (4) covers a part of the torque module (1) and is provided at portions corresponding to the swing arm assemblies (11) with a pair of cuts (41).

20. The assembly of torque module for hinge device as claimed in claim 17, wherein the curved arm support (4) covers a part of the torque module (1) and is provided at portions corresponding to the swing arm assemblies (11) with a pair of cuts (41).

* * * * *